(12) United States Patent
Naito

(10) Patent No.: US 9,739,035 B2
(45) Date of Patent: Aug. 22, 2017

(54) WORK VEHICLE

(71) Applicant: KOMATSU LTD., Tokyo (JP)

(72) Inventor: Makoto Naito, Komatsu (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/903,669

(22) PCT Filed: Jun. 17, 2014

(86) PCT No.: PCT/JP2014/066048
§ 371 (c)(1),
(2) Date: Jan. 8, 2016

(87) PCT Pub. No.: WO2015/019715
PCT Pub. Date: Feb. 12, 2015

(65) Prior Publication Data
US 2016/0168821 A1  Jun. 16, 2016

(30) Foreign Application Priority Data

Aug. 9, 2013  (JP) .................................. 2013-166205

(51) Int. Cl.
*E02F 9/08*  (2006.01)
*B60K 1/00*  (2006.01)
(Continued)

(52) U.S. Cl.
CPC .............. *E02F 9/0866* (2013.01); *B60K 1/00* (2013.01); *B60K 1/04* (2013.01); *B60K 6/28* (2013.01);
(Continued)

(58) Field of Classification Search
CPC ..... E02F 9/0866; E02F 9/2091; E02F 9/2095; B60K 6/28
See application file for complete search history.

(56) References Cited

U.S. PATENT DOCUMENTS 7,255,189 B2 * 8/2007 Kurtz, Jr. ............... B60K 11/04
123/41.43
8,596,397 B2 * 12/2013 Sakamoto ............ H05K 5/0204
180/68.5
(Continued)

FOREIGN PATENT DOCUMENTS

CN  201729056 U  2/2011
CN  103081046 A  5/2013
(Continued)

OTHER PUBLICATIONS

International Search Report for the corresponding international application No. PCT/JP2014/066048, issued on Aug. 5, 2014.
(Continued)

Primary Examiner — Brian Swenson
(74) Attorney, Agent, or Firm — Global IP Counselors, LLP

(57) ABSTRACT

A work vehicle includes a vehicle body frame, an outer cover, an engine compartment, a cooling compartment, a partition wall, an inverter, and a capacitor. The engine compartment contains an engine. The cooling compartment contains a cooling device. The partition wall separates the cooling compartment from the engine compartment. The inverter and the capacitor are disposed between the partition wall and the cooling device. The inverter is positioned above the capacitor. A length of the capacitor in the vehicle width direction is greater than a length of the inverter in the vehicle width direction. At least one of a first side surface of the outer cover positioned leftwards of the left side surface of the inverter and a second side surface of the outer cover positioned rightwards of a right side surface of the inverter is separated from the inverter by a gap.

17 Claims, 7 Drawing Sheets

(51) Int. Cl.
*B60K 6/40* (2007.10)
*B60K 6/28* (2007.10)
*B60K 1/04* (2006.01)
*B60K 11/00* (2006.01)
*E02F 3/28* (2006.01)
*E02F 9/20* (2006.01)
*H01G 2/04* (2006.01)

(52) U.S. Cl.
CPC .............. *B60K 6/40* (2013.01); *B60K 11/00* (2013.01); *E02F 3/283* (2013.01); *E02F 9/0808* (2013.01); *E02F 9/0858* (2013.01); *E02F 9/2075* (2013.01); *H01G 2/04* (2013.01); *B60K 2001/003* (2013.01); *B60Y 2200/415* (2013.01); *B60Y 2200/92* (2013.01); *B60Y 2400/114* (2013.01); *Y10S 903/907* (2013.01)

(56) References Cited

U.S. PATENT DOCUMENTS

| | | | | |
|---|---|---|---|---|
| 9,107,286 | B2* | 8/2015 | Tsuchiya | ............... E02F 9/0858 |
| 2002/0104239 | A1* | 8/2002 | Naruse | ..................... B60K 6/28 37/348 |
| 2012/0325569 | A1* | 12/2012 | Takeda | ..................... E02F 9/26 180/68.1 |
| 2013/0115037 | A1 | 5/2013 | Kinoshita et al. | |
| 2013/0134840 | A1* | 5/2013 | Murata | ................. E02F 9/0858 310/67 R |
| 2013/0141889 | A1 | 6/2013 | Tsuchiya et al. | |
| 2014/0000975 | A1 | 1/2014 | Ueda | |

FOREIGN PATENT DOCUMENTS

| | | |
|---|---|---|
| JP | 2002-227241 A | 8/2002 |
| JP | 2004-168149 A | 6/2004 |
| JP | 2004-169466 A | 6/2004 |
| JP | 2008-39206 A | 2/2008 |
| JP | 2008-62853 A | 3/2008 |
| JP | 2012-112102 A | 11/2010 |
| JP | 2012-41819 A | 3/2012 |
| JP | 2012-144140 A | 8/2012 |
| JP | 2012-172332 A | 9/2012 |
| JP | 2013-2170 A | 1/2013 |
| JP | 2013-147928 A | 8/2013 |

OTHER PUBLICATIONS

Office Action for the corresponding Japanese application No. 2014-543694, issued on Nov. 4, 2015.
The extended European search report for the corresponding European application No. 14834110.0, dated on Jan. 4, 2017.
The Office Action for the corresponding Chinese application No. 201480041211.8, issued on Apr. 19, 2017.

* cited by examiner

WORK VEHICLE

CROSS-REFERENCE TO RELATED APPLICATIONS

This application is a U.S. National stage application of International Application No. PCT/JP2014/066048, filed on Jun. 17, 2014. This U.S. National stage application claims priority under 35 U.S.C. §119(a) to Japanese Patent Application No. 2013-166205, filed in Japan on Aug. 9, 2013, the entire contents of which are hereby incorporated herein by reference.

BACKGROUND

Field of the Invention

The present invention relates to a hybrid work vehicle in which driving force is generated both by a diesel engine and by an electric motor.

Background Information

In recent years, hybrid work vehicles have been developed in which driving force is generated both by a diesel engine and by an electric motor (refer to Japanese Laid-Open Patent Publication 2012-041819).

SUMMARY

An inverter and a capacitor are needed for driving an electric motor. Since an inverter and a capacitor can easily be affected by heat, accordingly, it is necessary to locate them in places in which they cannot easily be subjected to the influence of the heat generated by the engine or the like.

In Japanese Laid-Open Patent Publication 2012-041819, a hydraulic shovel is disclosed as an example of a hybrid work vehicle. Since the vacant space within the engine compartment of this hydraulic shovel is large, accordingly, with the invention according to Japanese Laid-Open Patent Publication 2012-041819, a cooling fan and a cooling unit are disposed between the inverter and the capacitor, and the engine. Due to this, the influence of heat generated by the engine and so on is avoided.

However, since, with a wheel loader or a motor grader, only a small amount of vacant space is available within the engine compartment, and there is a limitation upon the position in which a cooling fan and/or a cooling unit can be disposed, accordingly, it is not possible to implement a configuration such as that described above.

The work vehicle according to one aspect of the present invention is a work vehicle in which driving force is generated by an engine and by an electric motor. The work vehicle includes a vehicle body frame, an outer cover, an engine compartment, a cooling compartment, a partition wall, an inverter, and a capacitor. The engine compartment internally houses the engine. The cooling compartment internally houses a cooling device. The partition wall separates the cooling compartment from the engine compartment. The inverter and the capacitor are disposed between the partition wall and the cooling device. The capacitor is supported upon the vehicle body frame. The inverter is positioned above the capacitor. A length of the inverter in the vehicle width direction is shorter than a length of the capacitor in the vehicle width direction. At least one of a first side surface of the outer cover positioned leftwards from a left side surface of the inverter and a second side surface of the outer cover positioned rightwards from a right side surface of the inverter is separated from the inverter by a gap.

A first distance in the vehicle width direction between a left side surface of the outer cover and the left side surface of the inverter may be greater than or equal to a second distance in the vehicle width direction between the left side surface of the outer cover and a left side surface of the capacitor. Moreover, a third distance in the vehicle width direction between a right side surface of the outer cover and the right side surface of the inverter may be greater than or equal to a fourth distance in the vehicle width direction between the right side surface of the outer cover and a right side surface of the capacitor.

A fifth distance in the vehicle width direction between a left side surface of the vehicle body frame and the left side surface of the inverter may be greater than or equal to a sixth distance in the vehicle width direction between the left side surface of the vehicle body frame and the left side surface of the capacitor. Moreover, a seventh distance in the vehicle width direction between a right side surface of the vehicle body frame and the right side surface of the inverter may be greater than or equal to an eighth distance in the vehicle width direction between the right side surface of the vehicle body frame and the right side surface of the capacitor.

At least one of the first side surface and the second side surface may include an opening portion for taking in external air. The opening portion and the inverter may be overlapped in a side view. The opening portion and the inverter may be separated by a gap.

The longest side of the capacitor may extend along the vehicle width direction. The shortest side of the inverter may extend along the longitudinal direction of the vehicle.

The longest side of the inverter may extend in the vertical direction.

The capacitor may be elastically supported by a capacitor support portion that is provided to the vehicle body frame.

The cooling device may include a radiator, an oil cooler, and an electric motor cooling device. The radiator, the oil cooler, and the motor cooling device may be arranged in a row along the vehicle width direction.

The cooling device may further include a hybrid cooler for cooling the capacitor and the inverter. The hybrid cooler may be disposed in front of the radiator, the oil cooler, and the motor cooling device, and moreover behind the inverter. Furthermore, the inverter may be spaced away by a gap from the hybrid cooler along the longitudinal direction of the vehicle.

The inverter may be installed as separated from the capacitor in the vertical direction by a gap.

With the hybrid work vehicle according to the above aspect of the present invention, the engine compartment in which the engine is installed and the cooling compartment in which the inverter and the capacitor are installed are separated by the partition wall. Accordingly, it becomes difficult for heat generated by the engine and so on to be transmitted to the inverter and to the capacitor. Furthermore, with this work vehicle, the length of the inverter in the vehicle width direction is shorter than the length of the capacitor in the vehicle width direction, and the side surface of the outer cover corresponding to either one of the left surface and the right surface of the inverter, and the inverter, are spaced apart by a gap. Therefore, the inverter and the capacitor are cooled by air. Accordingly, it becomes even more difficult for the inverter and the capacitor to be affected by the heat generated by the engine and so on. Accordingly, it becomes possible to arrange the inverter and the capacitor in positions in which it is difficult for them to be affected by the heat generated by the engine and so on, even in the case of a work vehicle, such as a wheel loader or a motor grader.

DESCRIPTION OF EXEMPLARY EMBODIMENTS

Figure 1:
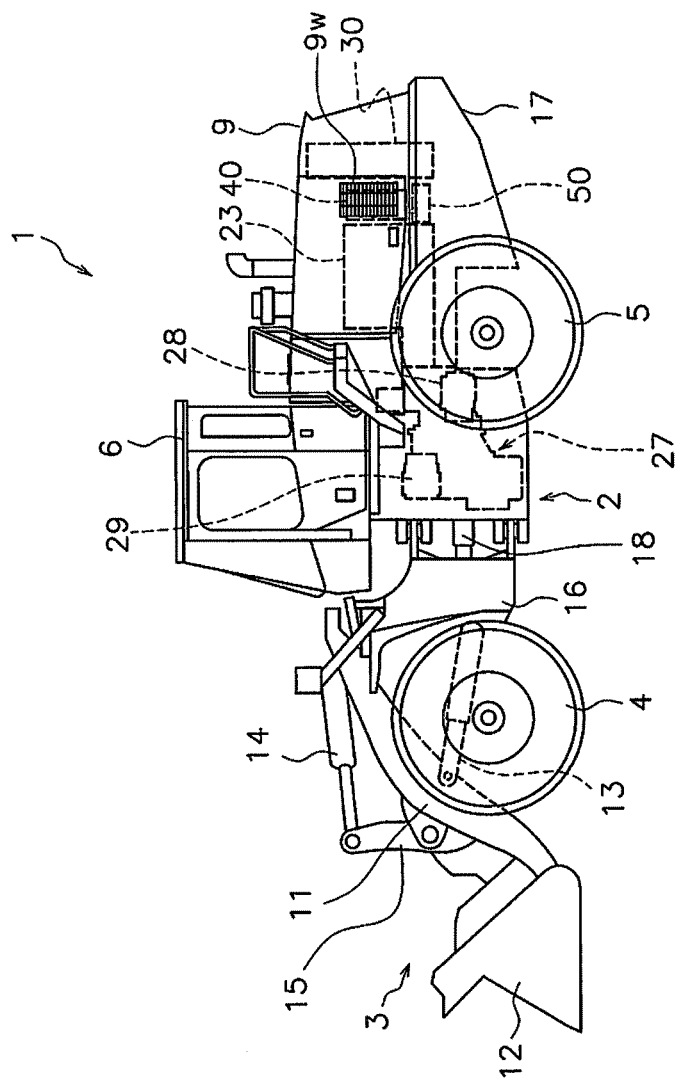
FIG. 1 is a side view of a work vehicle according to an exemplary embodiment of the present invention.

A side view of a work vehicle according to an embodiment of the present invention is shown in FIG. 1. Desirably, this work vehicle 1 is a wheel loader. It should be understood that, in FIG. 1, the main devices that are mounted within an engine compartment 21 that will be described hereinafter are shown by dotted lines.

Here, in the following explanation, "front" means the front of the vehicle and "rear" means the rear of the vehicle. Moreover, "left" means the leftwards direction of the vehicle when the viewer is facing the front of the vehicle, while "right" means the rightwards direction.

As shown in FIG. 1, the work vehicle 1 comprises a vehicle body frame 2, a working tool 3, propulsion wheels 4 and 5, and a driver compartment 6. The work vehicle 1 is propelled by the propulsion wheels 4 and 5 being rotationally driven. This work vehicle 1 is capable of performing a task, such as excavation or the like, by using the working tool 3.

The working tool 3 and the propulsion wheels 4 and 5 are attached to the vehicle body frame 2. The working tool 3 is driven by operating hydraulic fluid from an operating hydraulic fluid pump not shown in the figures. The working tool 3 includes a boom 11 and a bucket 12. The boom 11 is installed to the vehicle body frame 2. The working tool 3 has a lift cylinder 13 and a bucket cylinder 14. The lift cylinder 13 and the bucket cylinder 14 are hydraulic pressure cylinders. One end of the lift cylinder 13 is attached to the vehicle body frame 2. And the other end of the lift cylinder 13 is attached to the boom 11. The boom 11 is pivoted up and down due to the lift cylinder 13 receiving supply of operating hydraulic fluid from the operating hydraulic fluid pump and thereby being extended and retracted. The bucket 12 is attached at the end of the boom 11. One end of the bucket cylinder 14 is attached to the vehicle body frame 2. And the other end of the bucket cylinder 14 is attached to the bucket 12 via a crank 15. The bucket 12 is pivoted up and down due to the bucket cylinder 14 receiving supply of operating hydraulic fluid from the operating hydraulic fluid pump and thereby being extended and retracted.

The driver compartment 6 and the propulsion wheels 4 and 5 are attached to the vehicle body frame 2. The driver compartment 6 is mounted upon the vehicle body frame 2. A seat upon which the operator sits and operation devices and so on are disposed within the driver compartment 6. The vehicle body frame 2 includes a front frame 16 and a rear frame 17. The front frame 16 and the rear frame 17 are attached together to be capable of pivoting left and right with respect to one another.

The work vehicle 1 also comprises a steering cylinder 18. This steering cylinder 18 is attached both to the front frame 16 and to the rear frame 17. Here, the region that is supported by the front frame 16 is will be termed the "front vehicle body portion", while the region that is supported by the rear frame 17 will be termed the "rear vehicle body portion". The steering cylinder 18 is a hydraulic pressure cylinder. Due to this steering cylinder 18 being extended and retracted by operating hydraulic fluid supplied from a steering pump 30 not shown in the figures, the progression direction of the work vehicle 1 can be changed to the left and to the right.

Figure 2:
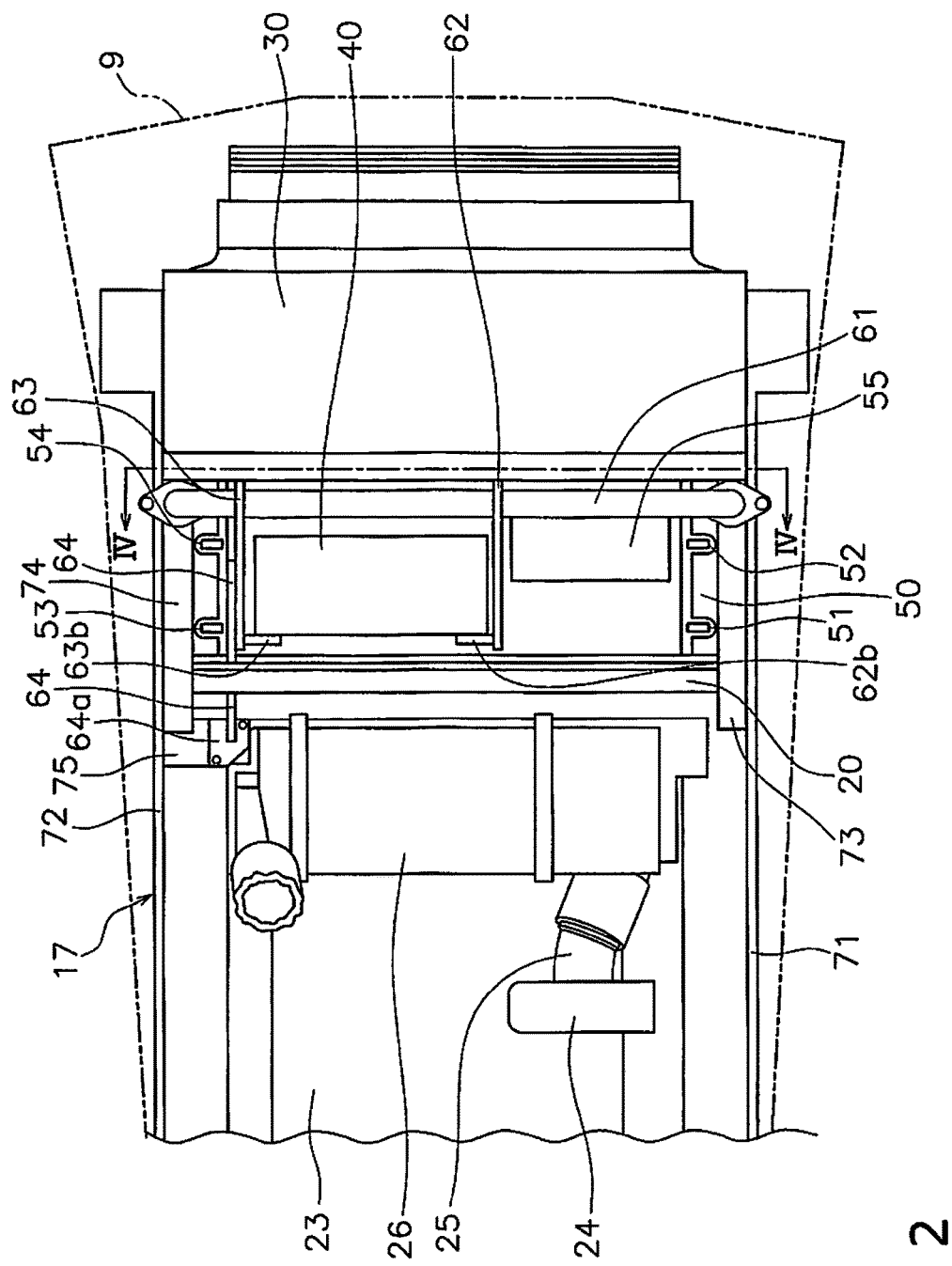
FIG. 2 is a figure showing a portion of the upper surface of the work vehicle of FIG. 1 in a state with an outer cover removed.
Figure 3:
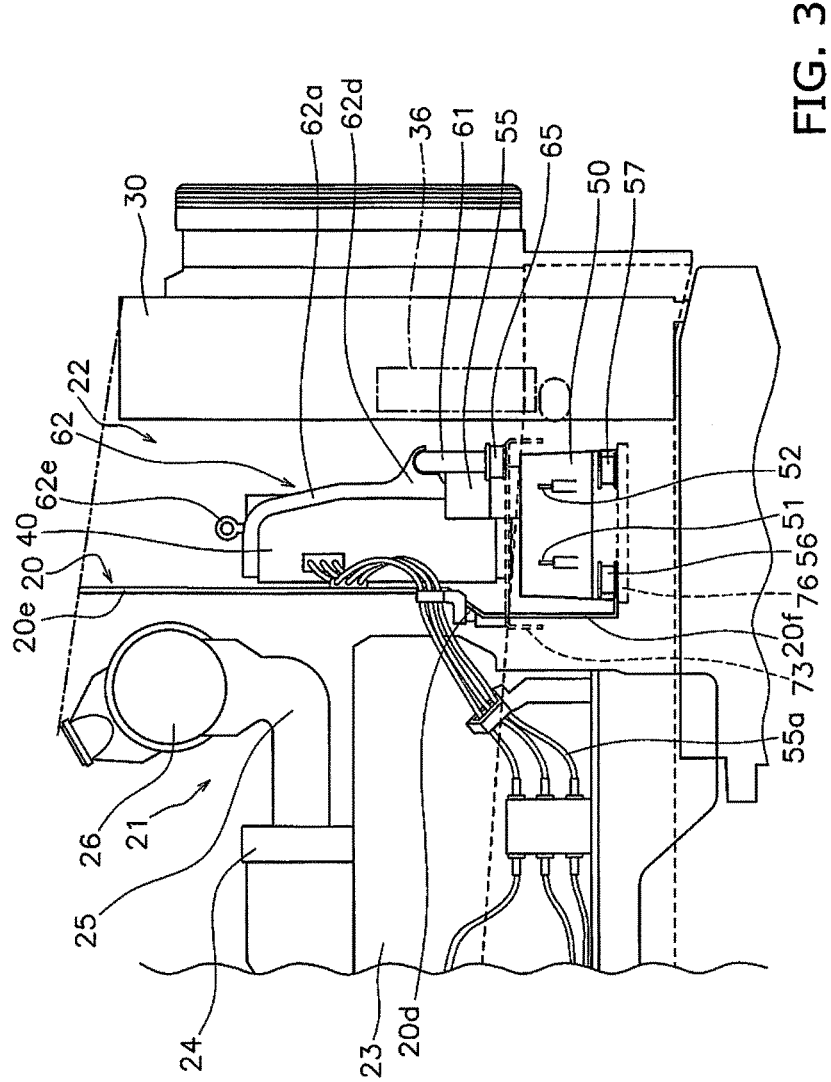
FIG. 3 is a figure showing the left side of the work vehicle of FIG. 1 with the outer cover removed.

Internal structures of the engine compartment and the cooling compartment FIG. 2 is a figure showing a top view of the rear vehicle body portion with an outer cover 9 (refer to FIG. 1) at the rear of the driver compartment 6 removed. In FIG. 2, the external shape of the outer cover 9 is shown by a double dotted broken line. And FIG. 3 is a figure showing the rear vehicle body portion in a left side view, with the outer cover 9 (refer to FIG. 1) at the rear of the driver compartment 6 removed. In FIG. 2 and FIG. 3, the part of the rear vehicle body portion that is more towards the front than the front half of an engine 23 is not shown. For convenience of explanation, the external shape of the rear frame 17 is shown by a dotted line in FIG. 3, and only components that are located within the rear frame 17 are shown fully.

As shown in FIG. 2, the rear frame 17 includes a left member 71 and a right member 72, both of which extend along the longitudinal direction of the vehicle. The left member 71 includes a left inverter support portion 73 and a left capacitor support portion 76 (refer to FIG. 3 etc.) which project inward (i.e. toward the right side) from the inner side surface of the left member 71 (i.e. of the rear frame 17 or the vehicle body frame 2). The right member 72 includes a right inverter support portion 74, a front inverter support portion 75 (refer to FIG. 4 etc.), and a right capacitor support portion 77 (refer to FIG. 4 etc.) which project inward (i.e. toward the left side) from the inner side surface of the right member 72 (i.e., of the rear frame 17 or the vehicle body frame 2). The left member 71 and the right member 72 are almost mutually symmetric, except for the fact that the right member 72 includes the front inverter support portion 75. In the description of this exemplary embodiment, the left inverter support portion 73, the right inverter support portion 74, and the front inverter support portion 75 will be generically termed "inverter support portions", while the left capacitor support portion 76 and the right capacitor support portion 77 will be generically termed "capacitor support portions". The details of the left inverter support portion 73, of the right inverter support portion 74, of the front inverter support portion 75, of the left capacitor support portion 76, and of the right capacitor support portion 77 will be described hereinafter.

As shown in FIG. 3, the rear vehicle body portion is subdivided by a partition wall 20 into an engine compartment 21 and a cooling compartment 22. In other words, the partition wall 20 separates the cooling compartment 22 from the engine compartment 21. The engine 23, an exhaust processing device 26, a transmission 27 (refer to FIG. 1), electric motors 28 and 29, and so on are disposed in the engine compartment 21. In other words, the engine 23 and the electric motors 28 and 29 are housed inside the engine compartment 21. It should be understood that, while two electric motors are shown in FIG. 1, the number of electric motors could be only one, or could be three or more. The engine 23 is, for example, a diesel engine. The engine 23 and the electric motors 28 and 29 are connected to the transmission 27, and generate driving force for the propulsion wheels 4 and 5. Furthermore, the engine 23 generates driving force for driving the operating hydraulic fluid pump, a steering pump, and so on.

The exhaust processing device 26 is preferably a diesel particle collection filter device (Diesel Particulate Filter: DPF), but it may be some other type of exhaust processing device, such as a selective catalytic reduction device (Selective Catalytic Reduction: SCR), a diesel oxidation catalyst device (Diesel Oxidation Catalyst: DOC), or the like. The exhaust of the engine 23 is sent to the exhaust processing device 26 via a turbocharger 24 and a connection conduit 25. The exhaust processing device 26 reduces the concentration of harmful substances in the exhaust.

A cooling device 30, an inverter 40, a capacitor 50, and so on are disposed within the cooling compartment 22. In other words, the cooling device 30, the inverter 40, and the capacitor 50 are housed inside the cooling compartment 22. The cooling device 30 includes devices for providing cooling for devices of various types in the work vehicle 1, such as a radiator 31 (refer to FIG. 7) and so on. The details of the cooling device 30 will be described hereinafter. When the electric motors 28 and 29 which are in the engine compartment 21 are functioning as generators, the inverter 40 converts the electrical power regenerated by these electric motors 28 and 29 into DC current. And, when the electric motors 28 and 29 which are in the engine compartment 21 are functioning as motors, the inverter 40 converts electrical power accumulated in the capacitor 50 into AC, and controls the electric motors 28 and 29. The capacitor 50 accumulates electrical power regenerated by the electric motors 28 and 29. As shown in FIG. 2 and FIG. 3, the inverter 40 and the capacitor 50 are disposed between the partition wall 20 and the cooling device 30.

Figure 4:
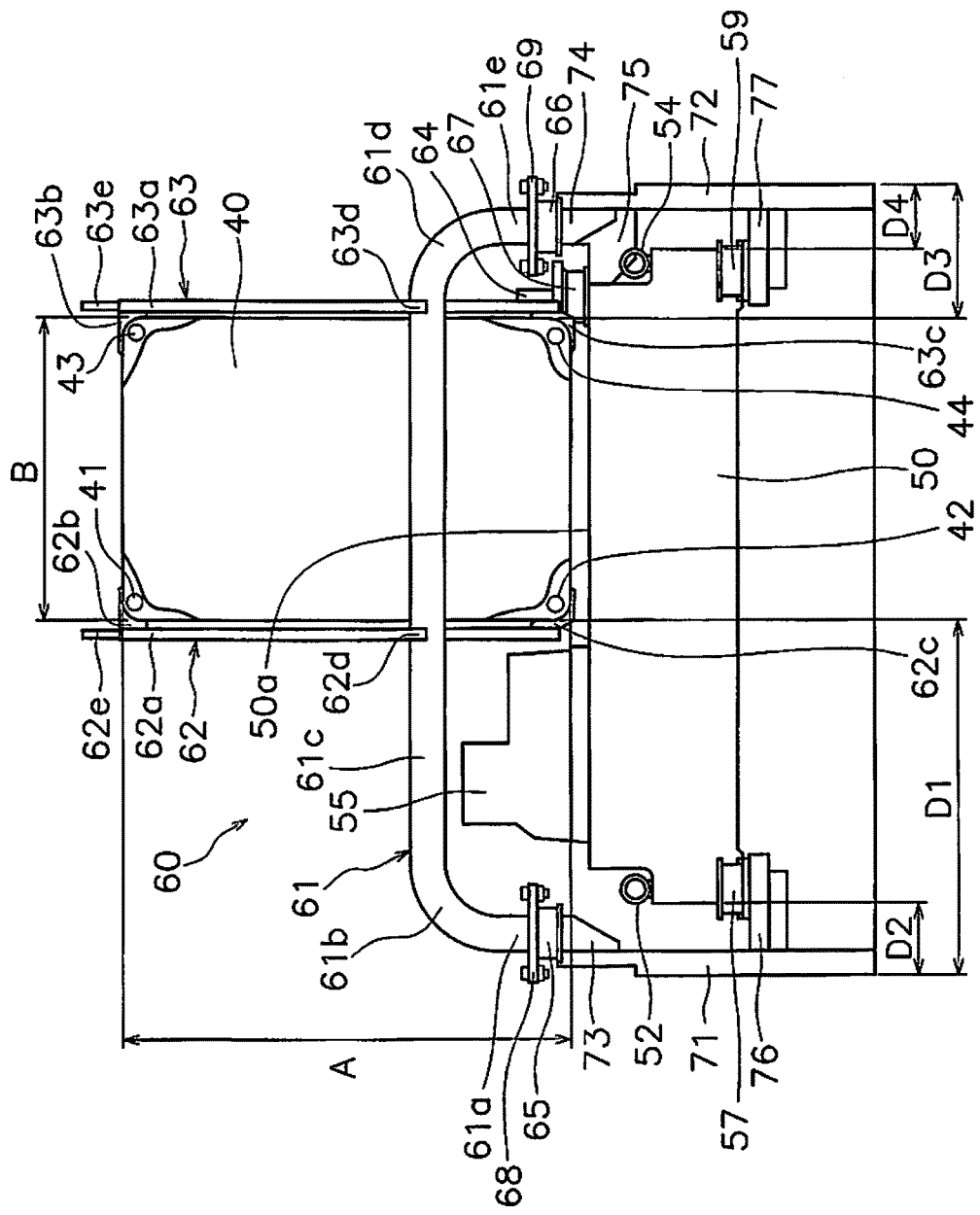
FIG. 4 is a figure showing an inverter, a capacitor, and their support components as seen in a sectional plane shown by the lines IV-IV in FIG. 2.
Figure 5:
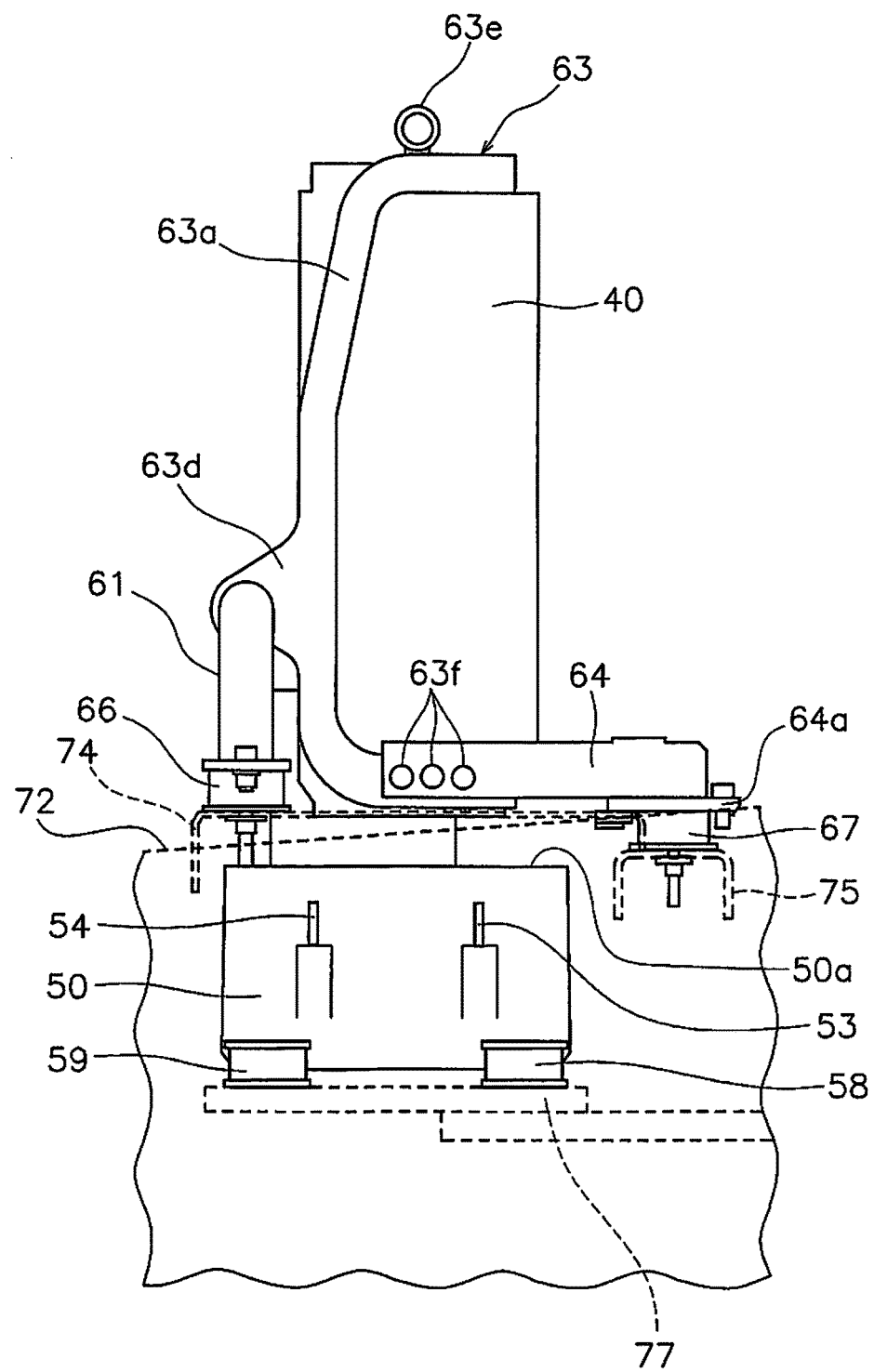
FIG. 5 is a right side view showing a portion of the work vehicle of FIG. 1 with its outer cover removed.

FIG. 4 is a figure showing the inverter 40, the capacitor 50, and their support components as seen in a sectional plane shown by the lines IV-IV in FIG. 2. FIG. 5 is a view showing the surroundings of the inverter 40, the capacitor 50, and their support components in a right side view. In FIG. 5, for the convenience of explanation, the right member 72, the right inverter support portion 74, the front inverter support portion 75, and the right capacitor support portion 77 are shown by dotted lines, and only the components inboard from the right member 72 are shown.

The capacitor 50 is a device having the shape of a rectangular parallelepiped. The capacitor 50 is, desirably, a long and narrow device. The capacitor 50 is disposed with its longitudinal direction extending along the vehicle width direction. In other words, the longest side of the capacitor 50 extends along the vehicle width direction. The capacitor 50 may include rings 51, 52, 53, and 54 for attachment to hanging hooks. As shown in FIGS. 2 through 4, it would also be possible further to provide a connector 55 upon the upper surface 50a of the capacitor 50. The rings 51, 52, 53, and 54 are positioned lower than the upper surface 50a of the capacitor 50. The rings 51, 52, 53, and 54 are positioned at both the left side and the right side of the capacitor 50. As shown in FIG. 2, the connector 55 is positioned at a portion of the upper surface 50a of the capacitor 50 toward its left rear.

The capacitor 50 is disposed upon the left capacitor support portion 76 and the right capacitor support portion 77. The left capacitor support portion 76 and the right capacitor support portion 77 are both horizontal, and are located in the same plane. As shown in FIGS. 3 through 5, the capacitor 50 is supported by the left capacitor support portion 76 and the right capacitor support portion 77 via elastic members 56, 57, 58, and 59. In other words, the capacitor 50 is elastically supported upon the capacitor support portions. To express this in another manner, the capacitor 50 is elastically supported by the vehicle body frame 2, or by the rear frame 17. Here, these elastic members 56, 57, 58, and 59 may, for example, be dampers.

As shown in FIG. 4, the left capacitor support portion 76 projects more inward (i.e. more towards the right side) as compared with the left inverter support portion 73. Furthermore, the right capacitor support portion 77 projects more inward (i.e. more towards the left side) as compared with the right inverter support portion 74. As a result, as shown in FIG. 2, the rings 51, 52, 53, and 54 can be directly accessed from above. As a result, fitting and removal of the capacitor 50 is simple and easy. Moreover, as shown in FIGS. 4 and 5 and so on, the upper surface 50a of the capacitor 50 is positioned lower than the upper edges of the vehicle body frame 2 (in more detail, than the upper edges of the rear frame 17, i.e. of the left member 71 and of the right member 72).

The inverter 40 is positioned above the capacitor 50. To put this in another manner, the capacitor 50 is positioned below the inverter 40. The inverter 40 is installed to be spaced apart by a gap in the vertical direction from the capacitor 50. As a result, as shown in FIG. 1, in a side view, the left side surface of the inverter 40 is overlapped over an opening portion 9w that is provided in the left side surface of the outer cover 9. Although this feature is not shown in the figures, it should be understood that the right side surface of the inverter 40 may be similarly overlapped over an opening portion provided in the right side surface of the outer cover 9 in a side view. Moreover, when the right side surface of the inverter 40 is overlapped over such an opening portion provided in the right side surface of the outer cover 9, then the opening portion 9w may not be provided in the left side surface of the outer cover 9.

Like the capacitor 50, the inverter 40 is also a device having the shape of a rectangular parallelepiped. As shown in FIGS. 2 through 5, the shortest side of the inverter 40 extends along the longitudinal direction of the vehicle. Moreover, as shown in FIG. 2, in a top view, the entire inverter 40 is overlaid over the capacitor 50. Accordingly, as shown in FIG. 4, the length of the inverter 40 in the vehicle width direction is shorter than the length of the capacitor 50 in the vehicle width direction. Furthermore, as shown in FIG. 5, the length of the capacitor 50 in the longitudinal direction of the vehicle is longer than the length of the inverter 40 in the longitudinal direction of the vehicle. Due to this, the capacitor 50 projects forward in the vehicle as compared to the inverter 40.

Yet further, as shown in FIG. 4, the distance D1 in the vehicle width direction between the left side surface of the left member 71 (i.e. of the rear frame 17 or the vehicle body frame 2) and the left side surface of the inverter 40 is greater than or equal to the distance D2 in the vehicle width direction between the left side surface of the left member 71 (i.e. of the rear frame 17 or the vehicle body frame 2) and the left side surface of the capacitor 50. As will be clear from FIG. 2, the distance between the left side surface of the outer cover 9 and the left member 71 and the distance between the right side surface of the outer cover 9 and the right member 72 become greater towards the rear of the vehicle. Thus, to compare together a point on the left side surface of the outer cover 9 and a point on the left side surface of the capacitor 50 whose distances in the longitudinal direction of the vehicle from the front of the vehicle are the same, the distance in the vehicle width direction between the left side surface of the outer cover 9 and the left side surface of the inverter 40 is greater than or equal to the distance in the vehicle width direction between the left side surface of the outer cover 9 and the left side surface of the capacitor 50. Moreover, the distance in the vehicle width direction between the right side surface of the outer cover 9 and the right side surface of the inverter 40 is greater than or equal to the distance in the vehicle width direction between the right side surface of the outer cover 9 and the right side surface of the capacitor 50. In other words, at least one of a first side surface of the outer cover 9 that is positioned in the leftwards direction from the left side surface of the inverter 40, and a second side surface of the outer cover 9 that is positioned in the rightwards direction from the right side surface of the inverter 40, is spaced away from the inverter 40 by a gap. Furthermore, the opening portion 9w and the inverter 40 are spaced apart from one another by a gap. Due to this, the entry of air from the opening portion 9w of FIG. 1 into the cooling compartment 22 becomes easier.

Still further, it is yet more desirable for the longest side of the inverter 40 to extend in the vertical direction, as shown in FIG. 4. Due to this, the height A of the inverter 40 becomes longer than its width B. As a result, the distances between the left and right side surfaces of the inverter 40 and the respective left and right side surfaces of the outer cover 9 can be made longer. Due to this, the entry of air from the opening portion 9w of FIG. 1 into the cooling compartment 22 becomes yet easier.

Brackets Supporting the Inverter

Next, brackets that support the inverter 40 will be explained. As shown in FIG. 4, these brackets 60 that support the inverter 40 include a first bracket 61, a second bracket 62, a third bracket 63, and a fourth bracket 64.

The first bracket 61 is supported by the left member 71 and the right member 72, and joins between the left member 71 and the right member 72. Desirably, this first bracket 61 is shaped from a pipe material and has an inverted letter-U shape. However, the interior of the first bracket 61 may not be hollow, and the cross-sectional shape of the first bracket 61 may be polygonal or elliptical.

The first bracket 61 includes a lower left end portion 61a, a first curved portion 61b, a straight line portion 61c, a second curved portion 61d, and a lower right end portion 61e. At its lower end, the lower left end portion 61a has a flange 68 for connection to the elastic member 65. In other words, the elastic member 65 is connected to the lower left end portion 61a. At its lower end, the lower right end portion 61e has a flange 69 for connection to the elastic member 66. In other words, the elastic member 66 is connected to the lower right end portion 61e. Desirably, the elastic members 65 and 66 are dampers. The central axes of the elastic members 65 and 66 coincide, respectively, with the central axes of the lower left end portion 61a and of the lower right end portion 61e. The elastic members 65 and 66 are respectively disposed upon the left inverter support portion 73 and upon the right inverter support portion 74. The left inverter support portion 73 and the right inverter support portion 74 are both horizontal, and are positioned in the same plane. Accordingly, the first bracket 61 is supported upon the left inverter support portion and upon the right inverter support portion 74 via the elastic members 65 and 66. In other words, the first bracket 61 is supported by the inverter support portions 73 and 74 (i.e. by the rear frame 17 or the vehicle body frame 2) via the elastic members 65 and 66. To put this in another manner, the first bracket 61 is elastically supported by the inverter support portions 73 and 74 (i.e. by the rear frame 17 or the vehicle body frame 2).

The first curved portion 61b is connected to the lower left end portion 61a and to the straight line portion 61c. The second curved portion 61d is connected to the lower right end portion 61e and to the straight line portion 61c. The first curved portion 61b and the second curved portion 61d may not be members shaped as circular arcs, but may be angled members shaped in a letter-L form. The straight line portion 61c extends along the vehicle width direction. Accordingly, the longitudinal direction of the first bracket 61 extends along the vehicle width direction.

As shown in FIG. 4, the second bracket 62 is fixed both to the left upper portion of the inverter 40 and also to the left lower portion of the inverter 40. A bolt 41 that fixes the second bracket 62 and the left upper portion of the inverter 40 together and a bolt 42 that fixes the second bracket 62 and the left lower portion of the inverter 40 together are shown in FIG. 4. The third bracket 63 is fixed both to the right upper portion of the inverter 40 and also to the right lower portion of the inverter 40. A bolt 43 that fixes the third bracket 63 and the right upper portion of the inverter 40 together and a bolt 44 that fixes the third bracket 63 and the right lower portion of the inverter 40 together are shown in FIG. 4. Since the second bracket 62 and the third bracket 63 are left and right symmetric except for a fourth bracket connection portion 63f (refer to FIG. 5), accordingly, in the following, the details of the shapes of the second bracket 62 and the third bracket 63 will be explained with principal attention being focused upon the third bracket 63.

The third bracket 63 comprises a base portion 63a, an upper right attachment portion 63b, a lower right attachment portion 63c, a second bracing portion 63d, a load hanging hook attachment ring 63e, and the fourth bracket connection portion 63f (refer to FIG. 5). As shown in FIG. 5, the base portion 63a extends in the vertical direction from the second bracing portion 63d, and extends in the forward direction when it reaches the vicinities of the upper and lower surfaces of the inverter 40. Moreover, as shown in FIG. 2, the upper right attachment portion 63b extends in the leftwards direction from the vicinity of the front edge of the upper portion of the base portion 63a. The upper right attachment portion 63b may include a female threaded portion for engagement with the bolt 43. Alternatively, the upper right attachment portion 63b does not include any such female threaded portion for engagement with the bolt 43, such that the bolt 43 may be fixed with a nut. As shown in FIG. 4, the lower right attachment portion 63c extends in the leftwards direction from the vicinity of the front edge of the lower portion of the base portion 63a. The lower right attachment portion 63c may include a female threaded portion for engagement with the bolt 44. Alternatively, the lower right attachment portion 63c does not include any such female threaded portion for engagement with the bolt 44, such that the bolt 44 may be fixed with a nut.

The second bracing portion 63d is fixed to the straight line portion 61c of the first bracket 61. In other words, the second bracing portion 63d braces the first bracket 61. Desirably, the second bracing portion 63d is fixed to the straight line portion 61c by welding. However, the second bracing portion 63d may be fixed to the straight line portion 61c by some other fixing means, such as a bolt and a nut or the like. In order for the third bracket 63 to support the inverter 40 in a stable manner, it is desirable for the height of the second bracing portion 63d to be close to the height of the barycenter of the inverter 40. In other words, it is desirable for the height of the straight line portion 61c of the first bracket 61 to be close to the height of the barycenter of the inverter 40. In FIG. 5, the height of the second bracing portion 63d (i.e. the height of the straight line portion 61c of the first bracket 61) is somewhat lower than the height of the center of the inverter 40 (i.e., than the height of its barycenter).

The ring 63e is provided at the upper edge of the base portion 63a. In other words, the ring 63e is provided to an upper portion of the third bracket 63. As shown in FIG. 5, in the state in which the inverter 40 is attached to the third bracket 63, the ring 63e is positioned at the center of the inverter 40 in the longitudinal direction of the vehicle. Due to this, it is possible to lift up the inverter 40 in a stable manner, even when raising the inverter 40 by attaching load hanging hooks to the ring 62e of the second bracket 62 and to the ring 63e of the third bracket 63, i.e., at only two spots.

The fourth bracket connection portion 63f is provided in the vicinity of the center of the bottom of the base portion 63a in the longitudinal direction of the vehicle. This fourth bracket connection portion 63f may have, for example, a female threaded portion for attachment of a bolt, so as to be attachable to and detachable from the fourth bracket 64.

It should be understood that the second bracket 62 includes a base portion 62a, an upper left attachment portion 62b, a lower left attachment portion 62c, a first bracing portion 62d, and a load hanging hook attachment ring 62e, respectively corresponding to the base portion 63a, the upper right attachment portion 63b, the lower right attachment portion 63c, the second bracing portion 63d, and the load hanging hook attachment ring 63e. In other words, the first bracing portion 62d braces the first bracket 61. The first bracing portion 62d is fixed to the straight line portion 61c by welding. Accordingly, the first bracket 61, the second bracket 62, and the third bracket 63 are integrally formed. Moreover, the ring 63e is provided at an upper portion of the third bracket 63. It should be understood that the upper left attachment portion 62b and the lower left attachment portion 62c extend in the opposite vehicle width direction to the upper right attachment portion 63b and the lower right attachment portion 63c respectively. Furthermore, the first bracing portion 62d is fixed to the straight line portion 61c of the first bracket 61 at almost the center of the straight line portion 61c in the vehicle width direction. The connector 55 is positioned leftwards of the second bracket 62.

The fourth bracket 64 is fixed to at least one of the second bracket 62 and the third bracket 63. The example described above shows the third bracket 63 has the fourth bracket connection portion 63f, and the fourth bracket 64 is fixed to the third bracket 63 thereby. However, the second bracket 62 may have the fourth bracket connection portion 63f, alternatively both the second bracket 62 and the third bracket 63 may have fourth bracket connection portions 63f and two of the fourth brackets 64 may be provided. In other words, one or two fourth brackets 64 may be attachable to and detachable from either or both of the second bracket 62 and the third bracket 63.

As shown in FIGS. 2 and 5, the fourth bracket 64 extends forwards from the fourth bracket connection portion 63f. That is to say, the fourth bracket 64 extends in the longitudinal direction of the vehicle. The fourth bracket 64 has a flange 64a at its front end for connection to an elastic member 67. In other words, the elastic member 67 is connected to the front end of the fourth bracket 64. Desirably, the elastic member 67 is a damper. The elastic member 67 is disposed upon the front inverter support portion 75.

As shown in FIG. 5, the front inverter support portion 75 is horizontal, but is positioned lower than the left inverter support portion 73 and the right inverter support portion 74. Moreover, as shown in FIG. 4, the front inverter support portion 75 projects more inwards (i.e., leftwards) as compared to the right inverter support portion 74. However no interference is caused when the capacitor is being installed or removed, since, as shown in FIG. 2, the front inverter support portion 75 is positioned sufficiently more forward than the ring 53.

It should be understood that, from the standpoint of improving the flexibility of arrangement of the various components, it is desirable for the amount of inward projection of the front inverter support portion 75 to be relatively small, and, in the width direction of the inverter 40, for the fourth bracket 64 to be positioned close to the vehicle body frame 2. In the example shown in FIGS. 2 through 5, the inverter 40 is disposed closer to the right member 72 than to the left member 71. In other words, as shown in FIG. 4, the distance D1 in the vehicle width direction between the inverter 40 and the left member 71 is longer than the distance D3 in the vehicle width direction between the inverter 40 and the right member 72. Accordingly, the fourth bracket 64 is fixed to the third bracket 63, which is on the right side of the inverter 40. In other words, the fourth bracket 64 is positioned on the right side of the inverter 40. It should be understood that, when the distance D3 is longer than the distance D1, then it is desirable for the fourth bracket 64 to be positioned on the left side of the inverter 40.

Due to this, it is possible to dispose components that have no relationship to the components that fix the inverter 40, such as the connector 55 and the power cables 55a that connect the inverter 40 to the electric motors 28 and 29 shown in FIG. 3 and so on, at that side among the left side and the right side of the inverter 40 that is remoter from the vehicle body frame (i.e., at the left side of the inverter 40 if the distance D1 is longer than the distance D3, and at the right side of the inverter 40 if the distance D3 is longer than the distance D1).

As described above, the fourth bracket 64 is supported by the front inverter support portion 75 via the elastic member 67. In other words, the fourth bracket 64 is supported by the vehicle body frame 2 via the elastic member 67. On the other hand, the first bracket 61 is supported by the left inverter support portion 73 and the right inverter support portion 74 via the elastic members 65 and 66. Consequently, the brackets 60 and the inverter 40 are elastically supported by the inverter support portions 73, 74, and 75 (i.e., by the rear frame 17 or the vehicle body frame 2). Accordingly, the brackets 60 and the inverter 40 are elastically supported at least at three spots upon the vehicle body frame 2 (the three points that support the elastic members 65, 66, and 67).

Here, the elastic members 65, 66, and 67 that support the brackets 60 and the inverter 40 and the elastic members 56, 57, 58, and 59 that support the capacitor 50 are completely different. Accordingly, the brackets 60 with the inverter 40, and the capacitor 50, constitute different vibrational systems. Therefore the brackets 60 with the inverter 40, and the capacitor 50, vibrate separately. Nevertheless, as shown in FIG. 4 and so on, since the inverter 40 is installed with a certain separation (gap) in the vertical direction from the capacitor 50, accordingly the brackets 60 with the inverter 40 and the capacitor 50 do not mutually collide.

The Arrangement and the Shape of the Partition Wall

Figure 6:
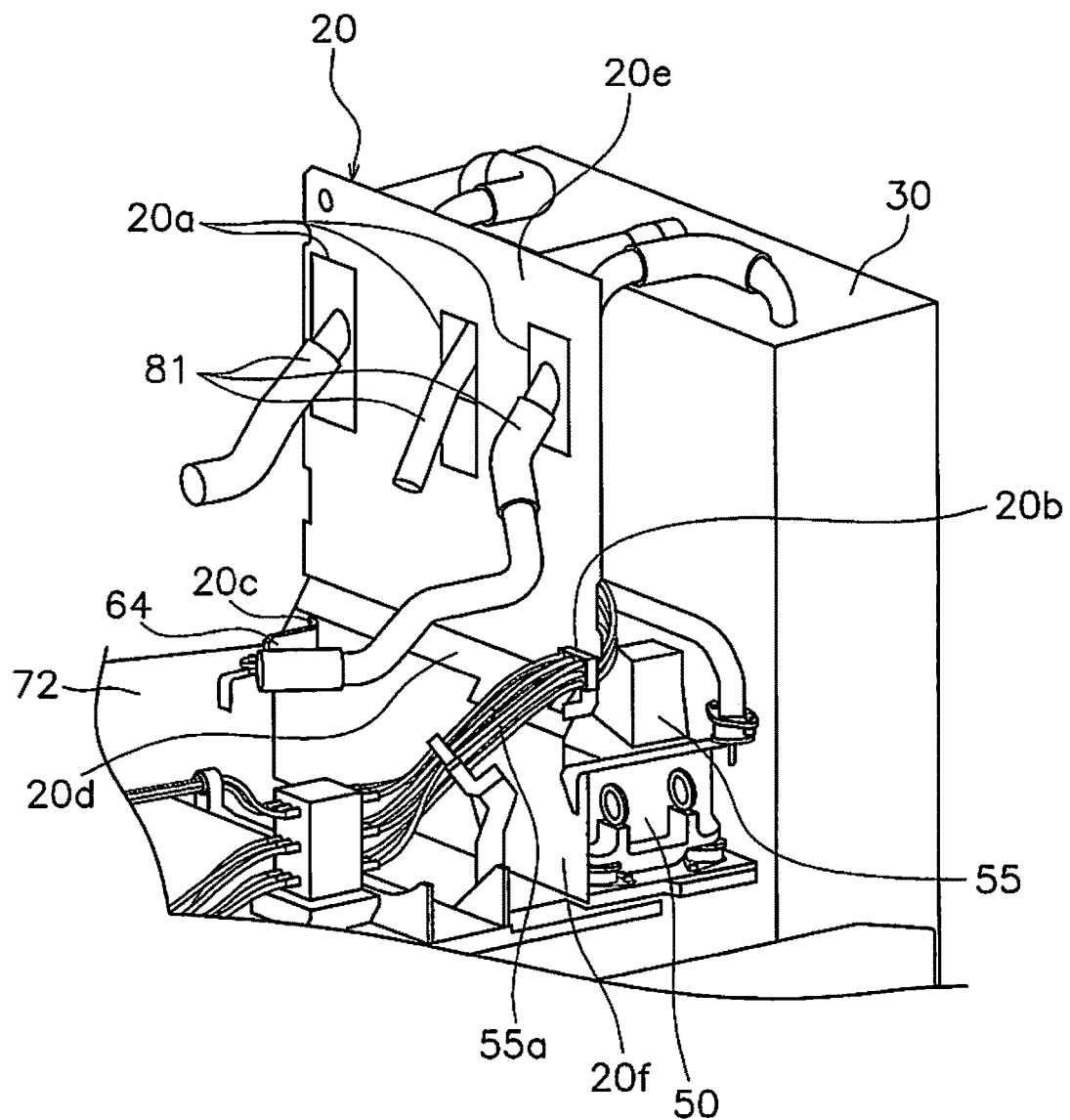
FIG. 6 is a perspective view showing a partition wall as seen slantingly from in front.

FIG. 6 is a perspective view showing the partition wall 20 as viewed slantingly from the front. In FIG. 6, the left member 71, the engine 23, the turbocharger 24, the connection conduit 25, the exhaust processing device 26 and so on are not shown. As shown in FIGS. 3 and 6, the partition wall 20 extends from the vicinity of the upper surface of the outer cover 9 to below the capacitor 50. It should be understood that, in FIG. 3, the upper surface of the outer cover 9 is shown by a double dotted broken line. The partition wall 20 includes through holes 20a for passing conduits 81 of various types that connect components of the engine 23 of various types and the cooling device 30. Moreover, the partition wall 20 includes a through hole 20b for passing the power cables 55a that connect the inverter 40 and the electric motors 28 and 29, and a through hole 20c for passing the fourth bracket 64.

The partition wall 20 has a curved portion 20d that curves forward from below the through hole 20b. As shown in FIG. 3, due to the partition wall 20 having the curved portion 20d, an upper vertical surface 20e of the partition wall 20 can be made to be close to the inverter 40, while a lower vertical surface 20f of the partition wall 20 can be made to be close to the capacitor 50. As a result, it is possible to make the partition wall 20 be close both to the inverter 40 and to the capacitor 50, so that it is possible to make both the capacity of the engine compartment 21 and the capacity of the cooling compartment 22 as small as possible. Accordingly, it is possible to make the vehicle more compact.

Details of the Cooling Device

Figure 7:
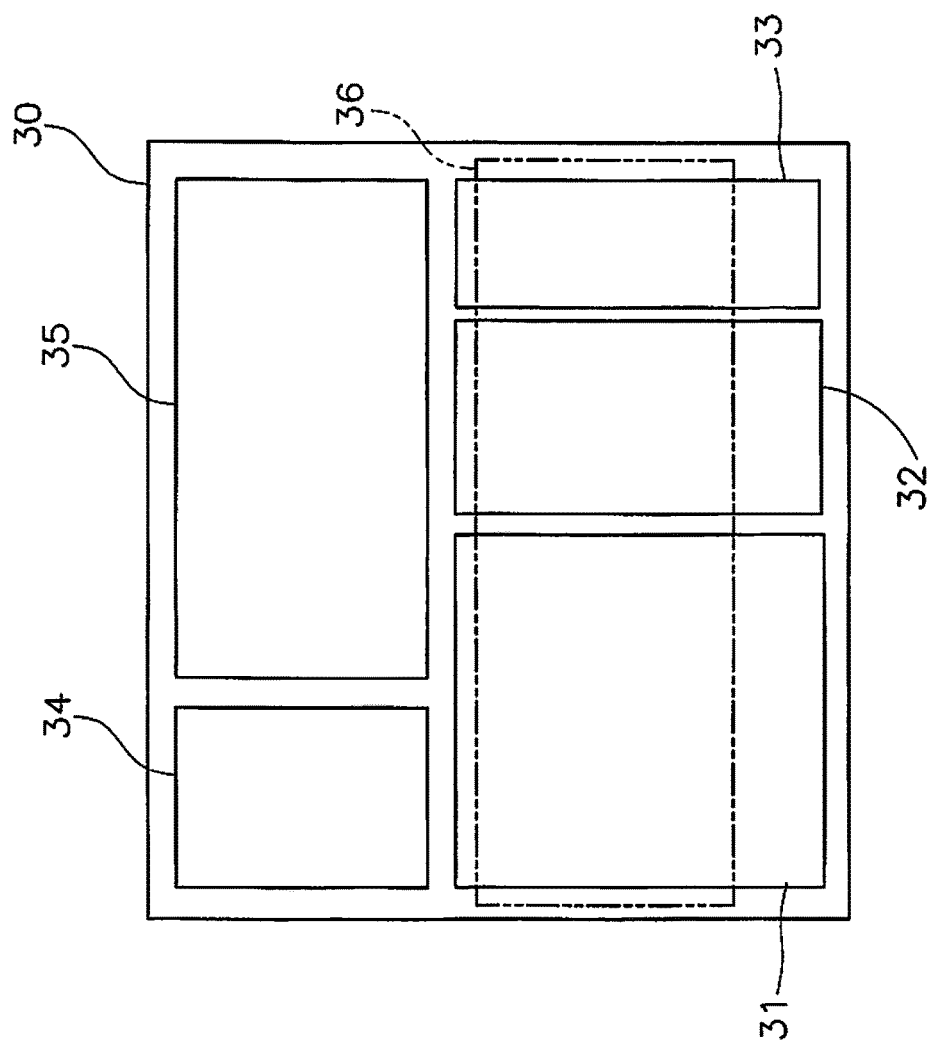
FIG. 7 is a figure showing the general structure of a cooling device.

FIG. 7 is a figure showing the general structure of the cooling device 30. In FIG. 7, a hybrid cooler 36 (the details of which will be described hereinafter) that is positioned more to the front is shown by double dotted broken lines. In order from the lower left, this cooling device 30 includes the radiator 31, an oil cooler 32, and an electric motor cooling device 33. Above them, the cooling device 30 further includes a charge air cooler (CAC) 34 and an air conditioner condenser 35. The cooling device 30 further includes a hybrid cooler 36 that is disposed in front of the radiator 31, the oil cooler 32, and the electric motor cooling device 33. The radiator 31, the oil cooler 32, and the electric motor cooling device 33 are disposed as arranged in a row along the vehicle width direction. In a similar manner, the CAC 34 and the air conditioner condenser 35 are disposed as arranged in a row along the vehicle width direction. The CAC 34 and the air conditioner condenser 35 are positioned above the radiator 31, the oil cooler 32, and the electric motor cooling device 33.

The oil cooler 32 cools hydraulic fluid that is used by hydraulic pressure devices of various types in the work vehicle 1. The electric motor cooling device 33 cools the refrigerant that takes away the heat generated by the electric motors 28 and 29. The CAC 34 cools the intake of the engine. The air conditioner condenser 35 cools the refrigerant of an air conditioner. And the hybrid cooler 36 cools the cooling water of the inverter 40 and of the capacitor 50.

In FIG. 3, the position of the hybrid cooler 36 is shown by a single dotted broken line. As shown in FIG. 3, the hybrid cooler 36 is disposed behind the inverter 40. Moreover, the inverter 40 is spaced apart by a gap from the hybrid cooler 36 in the longitudinal direction of the vehicle. Due to this it is possible to keep high the efficiency by which the inverter 40 and the capacitor 50 are cooled by external air, since the path for passage of air is not hindered by the hybrid cooler 36.

The work vehicle according to this exemplary embodiment has the following distinguishing characteristics.

In this work vehicle 1, the engine compartment 21 in which the engine 23 is installed and the cooling compartment 22 in which the inverter 40 and the capacitor 50 are installed are separated by the partition wall 20. Accordingly, it is difficult for heat generated by the engine 23 and so on to be transmitted to the inverter 40 and to the capacitor 50. Moreover, a path for the ingress of air is provided in this work vehicle 1, since the length of the inverter 40 in the vehicle width direction is shorter than the length of the capacitor 50 in the vehicle width direction, and furthermore since the side surfaces of the outer cover 9 corresponding to both the left and right side surfaces of the inverter 40 and the inverter are separated by gaps. Because the inverter 40 and the capacitor 50 are both cooled by air, accordingly, it becomes even more difficult for either the inverter 40 or the capacitor 50 to be affected by heat generated by the engine 23 and so on.

The first distance in the vehicle width direction between the left side surface of the outer cover 9 and the left side surface of the inverter 40 is greater than or equal to the second distance in the vehicle width direction between the left side surface of the outer cover 9 and the left side surface of the capacitor 50. Moreover, the third distance in the vehicle width direction between the right side surface of the outer cover 9 and the right side surface of the inverter 40 is greater than or equal to the fourth distance in the vehicle width direction between the right side surface of the outer cover 9 and the right side surface of the capacitor 50. In other words, the inverter 40 is not disposed in a position in which it is closer than the capacitor 50 to either the left or the right side surface of the outer cover 9. Accordingly, it becomes more difficult for the inverter 40 and the capacitor 50 to be affected by heat generated by the engine 23 and so on, since a sufficient flow of air enters from the intake path 9w.

The distance D1 in the vehicle width direction between the left side surface of the vehicle body frame 2 and the left side surface of the inverter 40 is greater than or equal to the distance D2 in the vehicle width direction between the left side surface of the vehicle body frame 2 and the left side surface of the capacitor 50. Moreover, the distance D3 in the vehicle width direction between the right side surface of the vehicle body frame 2 and the right side surface of the inverter 40 is greater than or equal to the distance D4 in the vehicle width direction between the right side surface of the vehicle body frame 2 and the right side surface of the capacitor 50. In other words, the inverter 40 is not disposed in a position in which it is closer than the capacitor 50 to either the left or the right side surface of the vehicle body frame 2. Accordingly, it becomes even more difficult for the inverter 40 and the capacitor 50 to be affected by heat generated by the engine 23 and so on, since a sufficient flow of air enters from the intake path 9w.

At least one of the left side surface and the right side surface of the outer cover 9 includes the opening portion 9w for taking in external air. In addition, the opening portion 9w and the inverter 40 are overlapped in a side view. Furthermore, the opening portion 9w and the inverter 40 are spaced apart from one another. As a result, the inverter 40 is effectively cooled by the external air that directly strikes against the inverter 40.

The longest side of the capacitor 50 extends along the vehicle width direction, and the shortest side of the inverter 40 extends along the longitudinal direction of the vehicle. Accordingly, it is possible to arrange the capacitor 50 and the inverter 40 within the cooling compartment 22 without making the length of the cooling compartment 22 in the longitudinal direction of the vehicle very long. In other words, it is possible to arrange the inverter 40 and the capacitor 50 within the cooling compartment 22 in a compact manner.

The longest side of the inverter 40 extends in the vertical direction. Accordingly, it is possible to make the distance between the inverter 40 and the entrance path 9w for the air longer. Moreover, since a larger amount of air flows in from the air entrance path 9w, accordingly, it becomes yet more difficult for the inverter 40 and the capacitor 50 to be affected by heat generated by the engine 23 and so on.

The capacitor 50 is elastically supported by the capacitor support portions 76 and 77 that project inwards from the inner side surfaces of the vehicle body frame 2. Due to this, it is possible to alleviate the influence of vibration generated by the engine 23 or the like upon the capacitor 50, and to alleviate the influence of elastic deformation of the vehicle body frame 2 upon the capacitor 50.

The radiator 31, the oil cooler 32, and the electric motor cooling device 33 are arranged along the vehicle width direction. Due to this, it is possible to make the configuration of the cooling device 30 compact, so that it is possible to restrain increase in the size of the vehicle.

The hybrid cooler 36 is disposed in front of the radiator 31, the oil cooler 32, and the electric motor cooling device 33, and moreover behind the inverter 40. The inverter 40 is spaced apart from the hybrid cooler 36 in the longitudinal direction of the vehicle. Due to this, air can easily pass even behind the inverter 40. As a result, the inverter 40 is cooled with the external air in an effective manner.

The inverter 40 is installed as separated from the capacitor 50 by a gap in the vertical direction. Due to this, it becomes easy for air to pass between the inverter 40 and the capacitor 50. As a result, the inverter 40 and the capacitor 50 are effectively cooled by external air.

Variant Exemplary Embodiments

While an exemplary embodiment of the present invention has been explained above, the present invention is not to be considered as being limited to this exemplary embodiment; various alterations are possible provided that the gist of the present invention is preserved.

In the exemplary embodiment described above, an example was explained in which the inverter 40 was spaced away from the capacitor 50. However, the inverter 40 may be connected to the capacitor 50. Moreover, instead of employing the brackets 60 for supporting the inverter 40, the inverter 40 may be fixed upon the capacitor 50 by some member provided upon the capacitor 50, or for the capacitor support portions 76 and 77 to support the inverter 40 together with the capacitor 50.

In the exemplary embodiment described above, the explanation centered upon an example in which the inverter 40 was disposed close to the right member 72. However, the inverter 40 may be disposed close to the left member 71. In this case, desirably, the fourth bracket 64 would be fixed to the second bracket 62, and it would be desirable for the support portion 75 to project inward (i.e. rightwards) from the inner side surface of the left member 71. Moreover, it would be desirable for the connector 55 and the power cables 55a to be disposed to the right side of the third bracket 63.

It would also be possible for a pump that circulates water between the hybrid cooler 36, the inverter 40, and the capacitor 50 to be provided in some appropriate position. In this case, it would be desirable for the pump to be provided in the vicinity of a position more to the front than the connector 55 upon the capacitor 50.

The number and the position of attachment components, such as bolts and so on, explained in the exemplary embodiment described above may be varied as appropriate. Moreover, the shapes of the first bracket 61, the second bracket 62, the third bracket 63, and the fourth bracket 64 may be different from those described. The inverter 40 and the capacitor 50 may not be precise rectangular parallelepipeds; for example, their angles could be rounded off, and their sides except the angles might be more or less irregular. Moreover, the inverter 40 may be cubical.

While, in the exemplary embodiment described above, a case was explained in which the first bracket 61 was formed from a pipe material, the first bracket 61 could also be a member of some other type. For example, the first bracket 61 could be made from steel channel, angle iron (steel) or H-section steel stock.

According to the exemplary embodiments of the present invention, it is possible to provide a hybrid work vehicle in which heat generated by an engine or the like cannot easily be transmitted to an inverter or to a capacitor.

The invention claimed is:

1. A hybrid work vehicle in which a driving force is generated by an engine and by an electric motor, comprising:
   a vehicle body frame;
   an outer cover;
   an engine compartment internally housing the engine;
   a cooling compartment internally housing a cooling device, the cooling device including a radiator for cooling the engine;
   a partition wall separating the cooling compartment from the engine compartment;
   an inverter disposed between the partition wall and the cooling device; and
   a capacitor disposed between the partition wall and the cooling device;
   the capacitor being supported upon the vehicle body frame;
   the inverter being positioned above the capacitor;
   a length of the inverter in a vehicle width direction being shorter than a length of the capacitor in the vehicle width direction; and
   at least one of a first side surface of the outer cover positioned leftwards from a left side surface of the inverter and a second side surface of the outer cover positioned rightwards from a right side surface of the inverter being separated from the inverter by a gap.

2. The hybrid work vehicle according to claim 1, wherein
   a first distance in the vehicle width direction between a left side surface of the outer cover and the left side surface of the inverter is greater than or equal to a second distance in the vehicle width direction between the left side surface of the outer cover and a left side surface of the capacitor; and
   a third distance in the vehicle width direction between a right side surface of the outer cover and the right side surface of the inverter is greater than or equal to a fourth distance in the vehicle width direction between the right side surface of the outer cover and a right side surface of the capacitor.

3. The hybrid work vehicle according to claim 2, wherein
   a fifth distance in the vehicle width direction between a left side surface of the vehicle body frame and the left side surface of the inverter is greater than or equal to a sixth distance in the vehicle width direction between the left side surface of the vehicle body frame and the left side surface of the capacitor; and
   a seventh distance in the vehicle width direction between a right side surface of the vehicle body frame and the right side surface of the inverter is greater than or equal to an eighth distance in the vehicle width direction between the right side surface of the vehicle body frame and the right side surface of the capacitor.

4. The hybrid work vehicle according to claim 3, wherein
at least one of the first side surface and the second side surface includes an opening portion for taking in external air;
the opening portion and the inverter are overlapped in a side view; and
the opening portion and the inverter are separated by a first gap.

5. The hybrid work vehicle according to claim 4, wherein
the longest side of the capacitor extends along the vehicle width direction; and
the shortest side of the inverter extends along a longitudinal direction of the vehicle.

6. The hybrid work vehicle according to claim 5, wherein
the longest side of the inverter extends in a vertical direction.

7. The hybrid work vehicle according to claim 6, wherein
the capacitor is elastically supported by a capacitor support portion provided to the vehicle body frame.

8. The hybrid work vehicle according to any one of claim 7, wherein
the cooling device further includes an oil cooler, and an electric motor cooling device; and
the radiator, the oil cooler, and the motor cooling device are arranged in a row along the vehicle width direction.

9. The hybrid work vehicle according to claim 8, wherein
the cooling device further includes a hybrid cooler for cooling the capacitor and the inverter;
the hybrid cooler is disposed in front of the radiator, the oil cooler, and the motor cooling device, and behind the inverter; and
the inverter is spaced away by a gap from the hybrid cooler along the longitudinal direction of the vehicle.

10. The hybrid work vehicle according to claim 9, wherein
the inverter is separated from the capacitor in the vertical direction by a second gap.

11. The hybrid work vehicle according to claim 1, wherein
at least one of the first side surface and the second side surface includes an opening portion for taking in external air;
the opening portion and the inverter are overlapped in a side view; and
the opening portion and the inverter are separated by a gap.

12. Previously Presented) The hybrid work vehicle according to claim 1, wherein
the inverter is separated from the capacitor in a vertical direction by a gap.

13. A hybrid work vehicle in which a driving force is generated by an engine and by an electric motor, comprising:
a vehicle body frame;
an outer cover;
an engine compartment internally housing the engine;
a cooling compartment internally housing a cooling device;
a partition wall separating the cooling compartment from the engine compartment;
an inverter disposed between the partition wall and the cooling device; and
a capacitor disposed between the partition wall and the cooling device,
the capacitor being supported upon the vehicle body frame such that a longest side of the capacitor extends along a vehicle width direction,
the inverter being positioned above the capacitor, a shortest side of the inverter extending along a longitudinal direction of the vehicle, a length of the inverter in the vehicle width direction being shorter than the longest side of the capacitor, and
at least one of a first side surface of the outer cover positioned leftwards from a left side surface of the inverter and a second side surface of the outer cover positioned rightwards from a right side surface of the inverter being separated from the inverter by a gap.

14. The hybrid work vehicle according to claim 13, wherein
the longest side of the inverter extends in a vertical direction.

15. The hybrid work vehicle according to claim 13, wherein
the capacitor is elastically supported by a capacitor support portion provided to the vehicle body frame.

16. A hybrid work vehicle in which a driving force is generated by an engine and by an electric motor, comprising:
a vehicle body frame;
an outer cover;
an engine compartment internally housing the engine;
a cooling compartment internally housing a cooling device;
a partition wall separating the cooling compartment from the engine compartment;
an inverter disposed between the partition wall and the cooling device; and
a capacitor disposed between the partition wall and the cooling device;
the capacitor being supported upon the vehicle body frame,
the inverter being positioned above the capacitor, a length of the inverter in a vehicle width direction being shorter than a length of the capacitor in the vehicle width direction; and
at least one of a first side surface of the outer cover positioned leftwards from a left side surface of the inverter and a second side surface of the outer cover positioned rightwards from a right side surface of the inverter being separated from the inverter by a gap,
the cooling device including a radiator, an oil cooler, and an electric motor cooling device, the radiator, the oil cooler, and the motor cooling device being arranged in a row along the vehicle width direction.

17. The hybrid work vehicle according to claim 16, wherein.
the cooling device further includes a hybrid cooler for cooling the capacitor and the inverter;
the hybrid cooler is disposed in front of the radiator, the oil cooler, and the motor cooling device, and behind the inverter; and
the inverter is spaced away by a gap from the hybrid cooler along a longitudinal direction of the vehicle.

* * * * *